United States Patent
Fukuzawa et al.

[11] Patent Number: 5,755,261
[45] Date of Patent: May 26, 1998

[54] VALVE ASSEMBLY

[75] Inventors: Satoru Fukuzawa, Kuwana; Shoichi Nakamura, Suzuka; Kenji Ito, Aichi, all of Japan

[73] Assignee: NTN Corporation, Osaka, Japan

[21] Appl. No.: 553,504

[22] PCT Filed: Mar. 31, 1995

[86] PCT No.: PCT/JP95/00630

§ 371 Date: Nov. 30, 1995

§ 102(e) Date: Nov. 30, 1995

[87] PCT Pub. No.: WO95/27162

PCT Pub. Date: Oct. 12, 1995

[30] Foreign Application Priority Data

Mar. 31, 1994 [JP] Japan ................. 6-062730
Dec. 29, 1994 [JP] Japan ................. 6-340196
Dec. 29, 1994 [JP] Japan ................. 6-340197

[51] Int. Cl.$^6$ .................... F16K 11/074; F16K 51/00
[52] U.S. Cl. .................... 137/625.17; 137/625.4; 251/355; 251/368
[58] Field of Search ............. 137/625.17, 625.4; 251/355, 368

[56] References Cited

U.S. PATENT DOCUMENTS

| | | | |
|---|---|---|---|
| 4,362,186 | 12/1982 | Parkison et al. | 137/625.17 |
| 4,378,029 | 3/1983 | Parkison | 137/625.17 X |
| 4,621,659 | 11/1986 | Pawelzik | 137/625.17 |
| 4,633,906 | 1/1987 | Tuchman | 137/625.17 |
| 4,738,281 | 4/1988 | Limet et al. | 137/625.17 |
| 4,935,313 | 6/1990 | Knapp et al. | 137/625.17 X |
| 4,942,902 | 7/1990 | Knapp | 137/625.17 |
| 4,971,112 | 11/1990 | Knapp | 137/625.17 X |
| 5,080,134 | 1/1992 | Orlandi | 137/625.17 |
| 5,329,958 | 7/1994 | Bosio | 251/355 X |
| 5,518,027 | 5/1996 | Saiki et al. | 137/625.17 X |

*Primary Examiner*—John Rivell
*Attorney, Agent, or Firm*—Wenderoth, Lind & Ponack

[57] ABSTRACT

A valve assembly has a valve seat formed with valve holes which can be opened and closed by sliding a valve body on the valve seat. Its water stopping capacity is kept high after long, continuous use. Its handle operability is also kept high. A valve seat 6 or valve body 11 is made of a synthetic resin composition comprising 100 parts by weight of a polycyanoarylether resin, and 40–165 parts by weight of glassy carbon having an average particle diameter not exceeding 25 μm. This resin composition may further comprise not more than 30 parts by weight of a fluororesin powder such as PTFE. Otherwise, the valve assembly may have a valve body 11 made of a ceramic material, and a valve seat 6 made of a synthetic resin having a land portion 12 formed on the center of its surface opposite the valve body 11. The diameter of the land portion 12 is smaller than the outer diameter of the valve body 11. Even if the valve seat 6 is deformed under water supply pressure, the land portion 12 can retain its shape. Thus, it is possible to prevent the formation of a gap between the valve body 11 and the land portion 12. A plurality of concentric grooves may be formed in the bottom surface of the lever holder 14. Which may bulge at its inner edge portion so that it has a dome shape. A lubricating grease should be retained in the grooves.

9 Claims, 7 Drawing Sheets

VALVE ASSEMBLY

TECHNICAL FIELD

This invention relates to a slide type valve assembly having a valve body adapted to be put into sliding contact with a valve seat and used in a tap of a water faucet, a faucet for mixing hot and cold water or a flow path changeover cock for a cleaner for flushing a toilet bowl with hot water.

BACKGROUND ART

Figure 9:
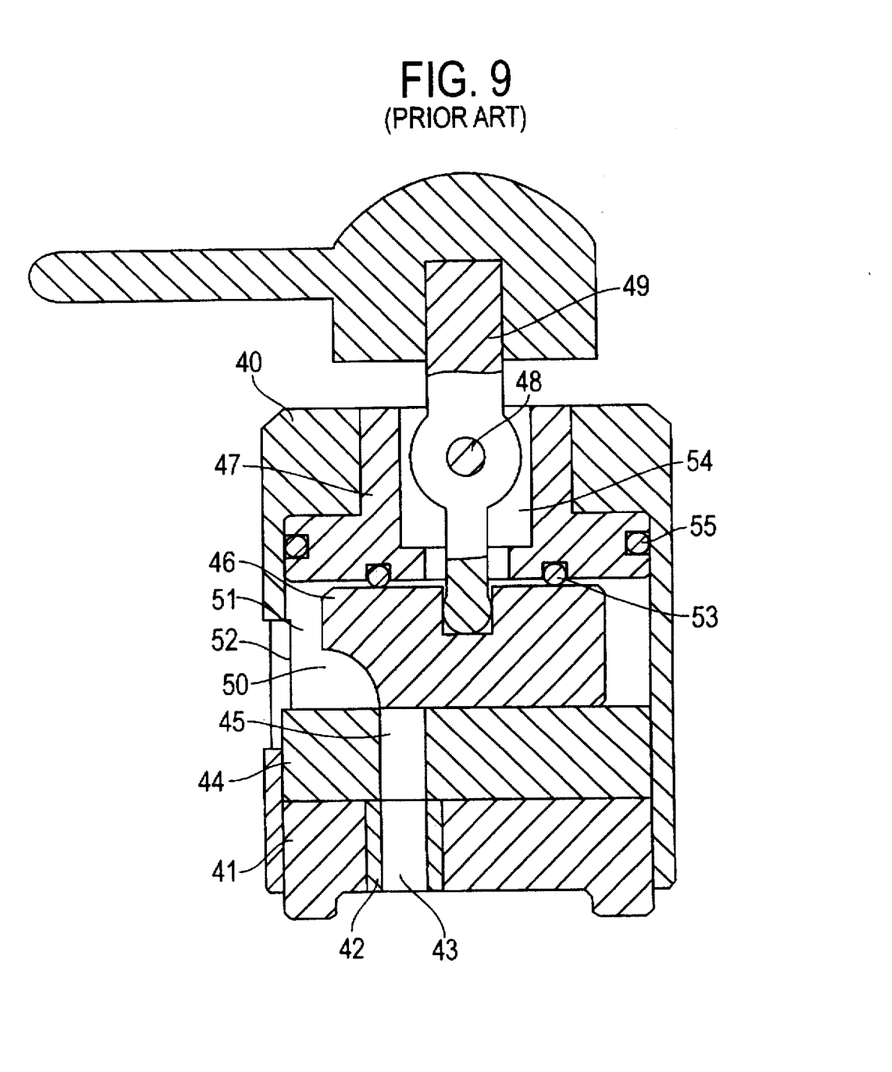
FIG. 9 is a vertical sectional front view of a conventional valve assembly.

FIG. 9 shows a conventional slide type valve assembly for mixing cold and hot water.

This valve assembly comprises a valve casing 40 and a bottom plate 41 attached to the bottom of the valve casing 40 and having two annular packings 42 (only one is shown) defining two inlet ports 43. A valve seat 44 is supported on the bottom plate 41 and has two valve holes 45 (only one is shown) communicating with the respective inlet ports 43. A valve body 46 is kept in contact with the top surface of the valve seat 44, a lever holder 47 is rotatably mounted on the valve body 46, and a lever shaft 49 is slidably supported on the lever holder 47 by means of a pin 48 and has its bottom end coupled to the valve body 46. By pivoting the lever shaft 49 right and left or up and down, the valve body 46 is slid on the top surface of the valve seat 44 so that the valve holes 45 can be selectively opened and closed.

By opening both valve holes 45, hot water supplied through one of the inlets 43 and cold water supplied through the other inlet 43 flow through the respective valve holes 45 and a passage 50 formed in the valve body 46 into a mixing chamber 51, and are mixed together. The water thus mixed is discharged through an outlet 52 formed in the valve casing 40.

A ring-shaped seal member 53 fitted in the bottom of the lever holder 47 is kept in contact with the top surface of the valve body 46 to keep water from leaking out through the gap between the valve body 46 and the lever holder 47 and a shaft hole 54 formed through the lever holder 47. Another seal member 55 is provided between the lever holder 47 and the valve casing 40 to prevent water leakage through the gap therebetween.

Unexamined Japanese Utility Model Publication 63-36765 disclose a valve assembly (of the type shown in FIG. 9) in which one of the valve body 46 and valve seat 44 is formed from a ceramic material and the other from resin having a self-lubricity such as fluororesin or an ultra-high-molecular polyethylene, or a resin containing a filler capable of improving lubricity such as molybdenum disulfide or carbon.

But a valve body made of such a self-lubricating resin is low in creep resistance. Even if a fibrous reinforcer is added to the material of such a valve body, it cannot sufficiently reinforce the valve body because the wettability between the reinforcer and the resin is poor. Such a valve body can prevent water leakage only while the water pressure is low.

If it is desired to improve the lubricity of a valve body made of a non-self-lubricating resin that has a high reinforcing effect, a large amount of lubricating filler has to be added thereto. The addition of such a large amount of filler will lead to marked reduction in shock strength and creep resistance. Such a valve body tends to develop cracks or can be a cause of poor water tightness.

Unexamined Japanese Patent Publication 2-190677 discloses a resin composition that shows somewhat improved creep resistance and lubricity. It comprises 25–80% by weight of a polyphenylene sulfide resin (hereinafter PPS resin) and 20–75% by weight of carbon fiber having an average fiber diameter not exceeding 8 μm with inorganic powdery fillers such as natural mica added.

Unexamined Japanese Patent Publication 6-213341 proposes to prevent the decrease in the water stopping capacity of a valve assembly by improving the wear resistance of sliding surfaces of a valve body made mainly of a PPS resin and a valve seat. Namely, this publication proposes to form at least one of the valve seat and the valve body from a resin composition comprising polycyanoarylether resin with carbon fiber added thereto.

The applicant of the present invention proposed in Unexamined Japanese Patent Publication 3-265769 a valve assembly having a valve body formed from a synthetic resin composition comprising a PPS resin or a polymer alloy containing a PPS resin with fillers added thereto, and a seal member underlying the lever holder and formed from a high-molecular weight polyethylene (HMWPE) to improve the sliding properties of the valve body relative to the valve seat and the seal member.

But the conventional valve assembly that uses the valve body containing carbon fiber has a problem in that the valve body shows anisotropy in the rate of shrinkage during molding. It cannot be formed with high dimensional accuracy. Self-lubricity is poor, too.

Besides high dimensional accuracy and self-lubricity, the valve body and valve seat of such a valve assembly are required to have a high wear resistance, to be less likely to be roughened by foreign objects and less likely to be swollen, to have a high creep resistance, and to keep high flatness even if subjected to mechanical or thermal shock. In short, it is important that they have a high ability to stop water.

An object of this invention is to provide a valve assembly which is free of these problems, whose valve body and valve seat will not suffer increased surface roughness at their frictional contact surfaces while in use and are less likely to be damaged by foreign objects that may be stuck between the frictional contact surfaces, which can stop water reliably even after long use, and which permits a smooth operation of the handle for adjusting the water supply.

A valve assembly whose valve seat and valve body are formed from a synthetic resin and a ceramic material, respectively, has problems in that water tends to leak when the valve is closed, and that its lever cannot be operated smoothly.

These problems occur presumably because the water supply pressure that acts on the annular packings 42 pushes up the outer-diameter edge of the valve seat 44, causing deformation of the valve seat 44 in such a way that a gap is formed at the contact portion between the valve seat 44 and the valve body 46.

A second object of this invention is to provide a valve assembly which permits a smooth operation of the lever for a long time, and which can prevent water leakage when the valve is closed even if the valve body is a ceramic member.

A conventional valve assembly has its valve body, which is made of a synthetic resin or a ceramic material, pressed against the valve seat into a sealed state, urged by a resilient rubber seal member. Thus, a large slide resistance is produced between the ring-shaped seal member and the valve body, impairing the movement of the lever. It is impossible to sufficiently reduce this slide resistance by simply applying a lubricant.

One possible solution to this problem would be to bring, instead of the rubber seal member, a ring-shaped synthetic resin valve seat into sliding contact with the valve body, because such a valve seat can more smoothly slide against the valve body, while providing the rubber seal member at a position where it is not brought into sliding contact with the valve body.

But this solution has a problem in that, due to insufficient liquid tightness between the valve seat and the valve body, water can easily leak through the gap between the slide contact surfaces of the valve seat and the valve body under a relatively low water pressure applied to the ring-shaped valve seat.

A third object of this invention is to prevent water leakage through the gap between the slide contact surfaces of the valve body and the ring-shaped valve seat having no valve holes and provided opposite to the water inlets with the valve body therebetween.

SUMMARY OF THE INVENTION

According to this invention, there is provided a valve assembly comprising a valve seat having valve holes, a valve body slidably mounted on the valve seat, and a lever for sliding the valve body against the valve seat to selectively open and close the valve holes. At least one of the valve body and valve seat is a molding of a resin composition comprising 100 parts by weight of a polycyanoarylether resin, and 40–165 parts by weight of glassy carbon having an average particle diameter not exceeding 25 µm.

The resin composition may further comprise not more than 30 parts by weight of a fluororesin powder, preferably tetrafluoroethylene resin powder. Such tetrafluoroethylene resin powder may be recycled tetrafluoroethylene resin powder.

In order to achieve the second and third objects, there is provided a valve assembly comprising a valve seat having valve holes and made of a synthetic resin, a valve body slidably mounted on the valve seat and made of a ceramic material, and a lever for sliding the valve body on the valve seat to selectively open and close the valve holes, the valve seat being formed with a cylindrical land portion on the center of its surface opposite the valve body so as to be brought into sliding contact with the valve body, the land portion having a diameter smaller than the outer diameter of the valve body.

For the same purpose, there is also provided a valve assembly comprising a valve seat having valve holes and being made of a synthetic resin. A valve body is slidably mounted on the valve seat, a seal member is kept in sliding contact with the valve body to seal the valve body liquid-tightly in a valve casing, and a lever for sliding the valve body on the valve seat selectively opens and closes the valve holes. The valve seat is formed with a cylindrical land portion on the center of its surface opposite the valve body so as to be brought into sliding contact with the valve body. The land portion has a diameter smaller than the outer diameter of the valve body, the valve body having a portion including its slide contact surface opposite the valve body and made of a ceramic material, and being a portion including its slide contact surface opposite the seal member and made of a synthetic resin.

In order to reduce the frictional resistance of the valve body and thus the lever operating force, a hole may be formed in a surface of the land portion to be brought into sliding contact with the valve body.

In order to achieve the first and third objects, there is provided a valve assembly comprising a valve seat having valve holes, a valve body slidably mounted on the valve seat, a lever for sliding the valve body on the valve seat to selectively open and close the valve holes, and a lever holder supporting the lever and keeping the valve body and valve seat in close contact with each other. The lever holder is formed with a plurality of concentric grooves in its surface to be brought into sliding contact with the valve body.

Preferably, the surface of the lever holder to be brought into sliding contact with the valve body has a dome shape, with its inner edge bulging from its outer edge. A lubricating oil or a lubricating grease may be retained in the concentric grooves.

DETAILED DESCRIPTION OF THE PREFERRED EMBODIMENT

The invention is described in more detail.

The polycyanoarylether resin (PEN for short) used in this invention is a compound comprising repeating units represented by formula 1 below, or a polymer comprising these repeating units and about 20 mol percent or less of other repeating units expressed by the formula 2, which amount is such that PEN's inherent properties will not be lost.

[Formula 1]

[Formula 2]

wherein Ar represents an aryl group such as

Preferably, the PEN has a reduced viscosity (ηsp/C) of 0.3 dl/g or higher at 60° C. in a 0.2 g/dl p-chlorophenol solution. Such PEN is e.g. polyethernitrile (ID300) sold by Idemitsu Kosan. The PEN may be manufactured in the manner disclosed in Unexamined Japanese Patent Publication 63-3059.

The glassy carbon used in this invention has no specific crystal structure (amorphous) and is obtained by calcining and carbonizing a phenolic or a fran resin. It is usually used in powder form.

Commercially available glassy carbons formed from phenolic resin powder include one obtained by calcining (heating) at 800° C. or 2000° C. a phenolic resin having methylol groups in its molecules and having a weight-average molecular weight of 3000 or higher (made by Kanebo: BELL-PEARL C-800, BELL-PEARL C-2000). If this carbon is used in the invention, its average particle diameter should be reduced to 25 μm or less. The higher the heating temperature, the more closely the glassy carbon obtained will resemble graphite in structure.

The content of glassy carbon in the material forming the resin valve body in the valve assembly according to this invention should be 40–165 parts by weight with respect to 100 parts by weight of PEN. If its content is below this range, the valve body's elastic modulus will be too low to stop water reliably. If higher than this range, moldability will be poor, and the shock resistance will be extremely low.

A fluororesin powder may be further added to this material to improve the sliding properties and thus to reduce the handle torque for the valve assembly and also to reduce sliding sound (noise) that tends to be produced while operating the handle.

The following are typical such fluororesins. Their thermal decomposition temperatures are shown in brackets.

1 polytetrafluoroethylene (PTFE), (about 508°–538° C.)

2 tetrafluoroethylene-perfluoroalkylvinylether copolymer (PFA), (about 464° C. or higher)

3 tetrafluoroethylene-hexafluoropropylene copolymer (FEP), (about 419° C. or higher)

4 polychlorotrifluoroethylene (PCTFE), (about 347°–418° C.)

5 tetrafluoroethylene-ethylene copolymer (ETFE), (about 347° C. or higher)

6 chlorotrifluoroethylene-ethylene copolymer (ECTFE), (about 330° C. or higher)

7 polyvinylidenefluoride (PVDF), (about 440°–475° C.)

8 polyvinylfluoride (PVF), (about 372°–480° C.)

9 tetrafluoroethylene-hexafluoropropylene-perfluoroalkylvinylether copolymer (EPE)

Also, the fluororesin may be a copolymer of two or more of the above fluororesin monomers that are mixed in a ratio of 1:10–10:1, or a fluorinated polyolefin of a ternary copolymer. These exhibit properties similar to those of a solid lubricant. Among them, PTFE is especially preferable because it has excellent heat resistance, chemical resistance and non-tackiness with a sufficiently low friction coefficient.

These fluororesins are also desirable because their derivative thermal decomposition starting temperatures are relatively high. For example, PTFE and PVDF have decomposition temperatures of about 490° C. and about 350° C., and derivative thermal decomposition starting temperatures of about 555° C. and 460° C., respectively. Among these fluororesins, perfluoro resins such as PTFE, PFA and FEP are especially preferable because they have excellent high-temperature properties. These resins withstand relatively well the abovementioned various thermal histories when forming the valve body from a polycyanoarylether resin by melting. PTFE is especially preferable because its decomposition point is about 100° C. higher than the melting point of polycyanoarylether resin (about 340° C.). By adding 3–30, preferably 5–15, parts by weight of such a fluororesin, it is possible to improve the shock resistance, fatigue resistance and wear resistance of the polycyanoarylether resin, which inherently has excellent mechanical properties with high creep properties, having a compressive strength of about 2100 kgf/cm$^2$ (on standard article), and excellent heat insulating properties and resistance to boiling water.

If its content is less than 3 parts by weight, it will be difficult to achieve the above results. If higher than 30 parts by weight, an unduly large load will act on the cylinder of a melt extruder due to the high melt viscosity of the fluororesin. This makes pelletizing and injection molding unstable and thus tends to lower the dimensional accuracy of the end product.

PFA and FEP have melt viscosities of about $10^4$–$10^5$ poise and about $4 \times 10^4$–$10^5$ poise, respectively, at about 380° C. PTFE has a melt viscosity of about $10^{11}$–$10^{12}$ poise at about 340°–380° C. Fluororesins having a high viscosity of about $10^4$–$10^{12}$ at such high temperatures are sufficiently heat-resistant and thus preferable.

If PTFE is added, its content should not exceed 30 parts by weight with respect to 100 parts by weight of PEN. If higher than 30 parts by weight, PEN's mechanical properties will be markedly impaired, so that the valve seat or the valve body is likely to be damaged.

PTFE powder of any particle shape and size can be used in the invention. But, to improve the uniformity of the resin composition, it should have a particle diameter not exceeding 70 μm.

Such PTFE powder should be a recycled material rather than a virgin material because the former is less likely to impair the mechanical properties of PEN. Recycled PTFE is obtained by calcining a virgin PEN once and then pulverizing it. It is less likely to become fibrous and can maintain the melt viscosity of the entire resin composition at a desired level. Thus, by adding it to the resin composition, its moldability will increase markedly.

A polycyanoarylether resin is a crystalline resin having a glass transition temperature of about 145° C. After forming a valve body from this resin, it may be heated to promote its crystallization and thus to increase its dimensional stability.

The valve body formed by adding such heat-resistant fillers to heat-resistant polycyanoarylether resin and molding will never suffer heat deformation even when exposed to boiling water of about 100° C. Its durability is also sufficiently high.

The valve seat or the valve body of the valve assembly is formed from a mixture of PEN, glassy carbon and PTFE powder. These ingredients may be mixed together in any manner. For example. These ingredients and optionally various other additives may be mixed one by one or two or more at a time in such a mixer as a Henschel mixer, a ball mill or a tumbler mixer.

They may then be molded into a predetermined shape by melting and mixing them with a heat roll, a kneader, a Banbury mixer or a melt extruder. The melt-mixing temperature should be higher than the melting point of the PEN, more specifically 330°–400° C., preferably 340°–380° C.

Any desired melt-molding method may be used to form a valve seat or body. But for higher mass-productivity and low cost, injection molding is preferable. But with injection molding only, it is very difficult to mold the resin composition to a desired final shape having a required flatness on the sliding contact surface. Thus, it is preferable to employ a so-called injection-compression molding technique in which the resin composition can be injection-molded and then compression-molded in a common mold.

Preferably, the thus molded material is further machined to provide a sufficiently flat sliding surface. For example, after adjusting the parallelism and flatness of the molded material with a surface grinder, its surface is polished off by about 10–50 μm with a lapping machine having extremely fine abrasive grains made mainly of alumina or silicon carbide.

Since the resin composition, which is softer than metals, is lapped by hard abrasive grains, initially there was a fear that the abrasive grains might sink into the resin. But this scarcely happened when grains having a hardness of #2000 or higher were used. The sliding surface formed was high in flatness and low in surface roughness. The reason why such good results were obtained is not clearly known. This is presumably because the harder the abrasive grains, the lower the heat buildup of the material to be lapped and thus the less the surface hardness and the yield stress are likely to drop.

Such adjustment of flatness is made simultaneously when polishing the surface. Since it is possible to grind and lap a plurality of molded resin articles at the same time and in far shorter time than when grinding and lapping ceramic or metallic articles, such resin articles can be manufactured at low cost.

If the valve body is to be formed from a ceramic material, the ceramic material used should preferably be selected from the new and conventional ceramic materials shown in Table 1, each having a strength and a hardness in predetermined ranges.

In order to improve the strength and/or thermal properties of the material, $SiO_2$, $Y_2O_3$, $Al_2O_7$, AlN, TaN, TiC, Co, rare earth elements, and/or other harmless elements may be further added by about 1–10% by weight.

The above-listed ceramic materials are all refractory materials. Though their heat insulating properties are inferior to resins, their linear expansion coefficients are about 1/10 lower than those of resins. Thus, by using one of these ceramic materials, it is easier to narrow the gap between the valve body and the valve seat of the valve assembly and it is possible to provide a valve assembly with high gap accuracy.

By forming the valve body from a material having a relatively low linear expansion coefficient, high heat insulating properties, and a thermal shock resistance of about 100° C. or higher, or about 200° C. or higher if safety is of higher importance, it is possible to minimize the gap that may be formed between the valve body and the valve seat and thus to prevent them from rattling even if they are used in an environment where the temperature fluctuates over a wide range such as in a valve assembly for mixing hot and cold water together. Also, use of such a valve body permits operation of the lever with low torque and can prolong the life of the valve assembly.

Alumina (aluminum oxide, $Al_2O_3$), one of typical fine ceramic materials, can exhibit the properties shown in Table 2 depending on its crystal structure and the kinds of additives used. This alumina, high in mechanical strength, heat resistance and dimensional stability, and reasonable in cost, is most desirable as a material for the valve seat or valve body of a valve assembly.

A valve body formed from a ceramic material whose compressive strength, bending strength, hardness, linear expansion coefficient, thermal conductivity and heat shock resistance are in the ranges shown in Table 2 will show a bending strength and hardness sufficient to withstand a water pressure of about 17.5 kgf/cm. Such a valve body will never be deformed. Also, since this valve body has a high heat insulating capacity and heat shock resistance, the valve assembly can trap heat effectively and keep the boiling water at a stable temperature. Further, due to its high heat shock resistance, the valve body will never be damaged even if it is exposed to both boiled water and cold water simultaneously. Its corrosion resistance is also sufficiently high.

The valve assembly of this invention has its valve seat or valve body molded from a resin composition comprising a polycyanoarylether resin and a predetermined amount of glassy carbon having an average particle diameter not exceeding 25 μm. Such a valve seat or valve body will show an improved lubricity and wear resistance, as well as improved mechanical and thermal shock resistance. Since the glassy carbon as a filler has no anisotropy, it is possible to form a valve seat or valve body with high accuracy in its sliding surface roughness and flatness and dimensional accuracy.

The valve assembly having such valve seat and valve body maintains high water stopping capacity and permits smooth and easy operation of the lever even after a long, continuous use.

By adding PTFE powder to this resin composition, it is possible to improve the sliding properties of the valve body or valve seat and thus to reduce the handle torque as well as sliding sound (noise) when the handle is operated.

By forming a land portion smaller in diameter than the valve body on the surface of the valve seat opposite the valve body, even if the valve seat is deformed under water supply pressure acting when shutting off water, it is deformed only at its outer-diameter portion. The land portion itself is always kept in contact with the valve body, preventing water leakage.

The valve body may be formed from a ceramic material at its portion including the surface kept in sliding contact with the valve seat, and from a synthetic resin having better sliding properties than ceramic material, at its portion including the surface kept in sliding contact with the seal member of the valve body. With this arrangement, since the valve body can slide smoothly against the seal member, it is possible to liquid-tightly seal the valve body in the valve casing for a long time. The valve body can be moved more smoothly with the lever.

By forming a hole in the surface of the land portion to be brought into sliding contact with the valve body, it is possible to reduce the contact area between the valve seat and the valve body and thus to reduce the slide resistance of the valve body. The lever operability thus improves still further.

By forming a plurality of concentric grooves in the surface of the lever holder to be brought into sliding contact with the valve body, the portions of the bottom surface separated by the concentric grooves act like banks which can prevent leakage of water from the outer edge of the slide contact surface toward its inner edge.

By forming the surface of the valve body to be brought into sliding contact with the lever holder into a dome shape by bulging its inner edge portion, the lever operability will improve still more.

By retaining lubricating oil or lubricating grease in the concentric grooves, it is possible to reduce slide resistance of the valve seat still further while preventing water leakage. Thus, the lever operability improves even more.

Further, by forming the surface of the lever holder to be brought into sliding contact with the valve body into a dome shape by bulging its inner edge portion, this surface will become completely flat if an excessive pressure acts on this surface, so that this surface is more closely brought into contact with the valve body.

Thus, when the fluid pressure acts on the seal ring, the fluid flowing in the valve body will never leak through a gap between the valve seat and the valve body.

(EXAMPLES 1–8 AND COMPARATIVE EXAMPLES 1–9)

The materials used in the Examples and the Comparative Examples are shown below. Abbreviations are in brackets. Their contents are in weight part.

Figure 1:
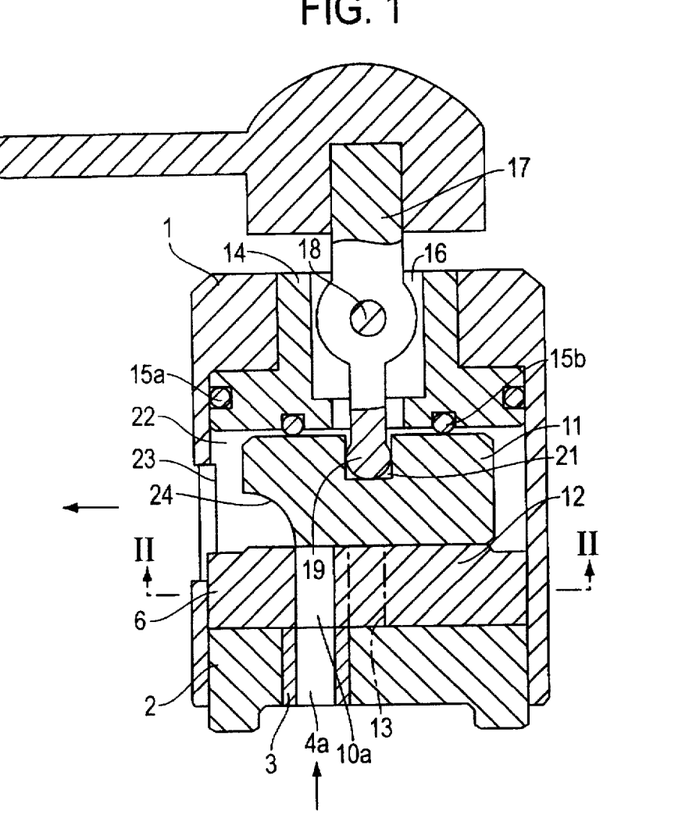
FIG. 1 is a vertical sectional front view of Example 9.

(1) polycyanoarylether resin (PEN)
ID 300 made by Idemitsu Kosan
(2) glassy carbon (GC)
BELL-PEARL C-2000 by Kanebo
(3) recycled tetrafluoroethylene resin (PTFE)
TFE-KT 400H by Kitamura
(4) ultra-high-molecular-weight polyethylene (PE)
LUBMER injection-molded grade by Mitsui Petrochemical
(5) polyphenylenesulfide resin (PPS)
T-4 by Tohpren
(6) polyetherimide resin (PEI)
ULTEM 1000 by General Electric
(7) polyethersulfone resin
VICTREX 4800P by I.C.I
(8) carbon fiber (CF)
BESFIGHT HTA by Toray, fiber diameter: 7.2 μm tensile elongation: 1.52%
(9) mica (mica)
MICA S-200 by Canada Mica, average particle diameter: 60 μm A valve body (having the shape shown in FIG. 3) adapted to be mounted in a valve assembly of the type shown in FIG. 1 (the type having a flat-topped valve seat) was manufactured in the following manner.

The materials were added at the rates shown in Tables 3 and 4 and dry-mixed. The mixtures were then fed into a twin-screw extruder (made by Ikegai Tekko: PCM-30) to pelletize them by extruding. The pellets thus obtained were injection-molded in a predetermined mold. The sliding surfaces of the valve bodies thus formed were machined with a surface grinder to increase their flatness, and then lapped with a lapping machine to sufficiently reduce their surface roughness (to about Ra 0.1–0.2 μm).

The valve bodies thus formed were mounted in valve assemblies together with ceramic valve seats, and subjected to function tests to determine the water stopping capacity, lever operability, resistance to damage and deformation upon absorbing water. The results are shown in Tables 3 and 4.

(1) Water Stopping Capacity and Operability of the Lever

Figure 6:
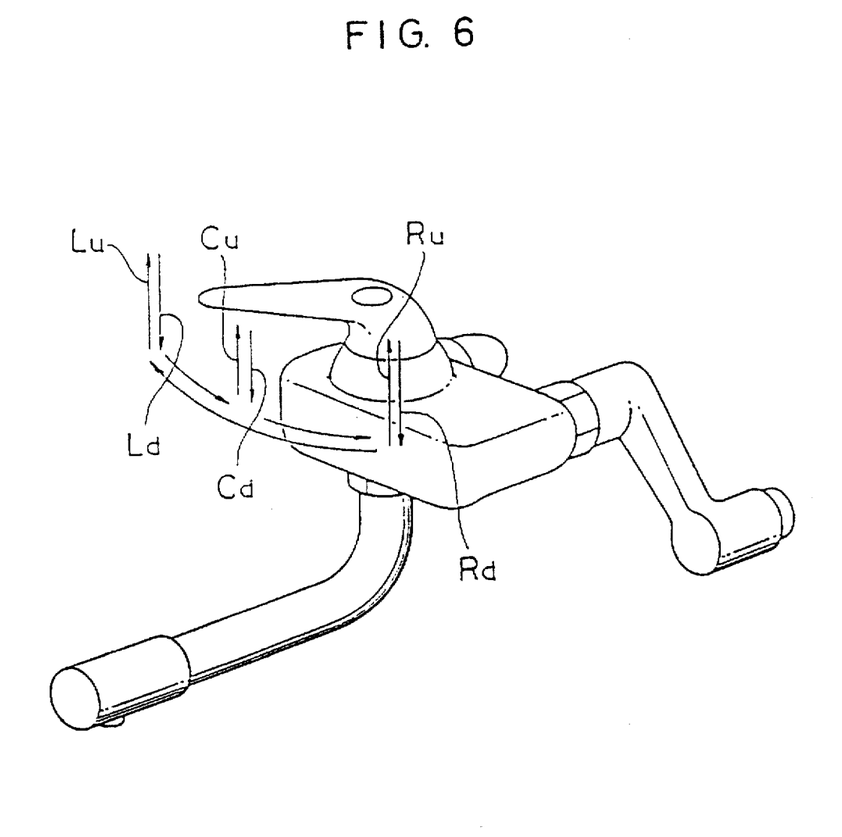
FIG. 6 is a perspective view of a water-mixing faucet showing movement of its lever.

These valve assemblies were mounted in a single-levered, water-mixing faucet shown in FIG. 6 to determine their water stopping capacity and operability of the lever.

The water stopping capacity was determined by measuring the amount of reduction of the water pressure ($kgf/cm^2$) due to water leakage after applying a water pressure of 17.5 $kgf/cm^2$ for 30 seconds with a pump, while keeping the lever in the lower central position (where the supply of water is supposed to be cut off). If the amount of the pressure reduction was less than 0.3 $kgf/cm^2$, the valve was judged to have a passable water stopping capacity.

In the lever torque test, the torque required when moving the lever up and down (to adjust water supply from zero to maximum), and right and left (to adjust water temperature) was measured using a torque meter (DFG-2K made by Simpo Kogyo). If the torque was in the range from 300 to 1000 gf, the valve assembly was judged to be passable. The torque should be higher than 300 gf. Otherwise, the handle may move down spontaneously by gravity. A handle torque larger than 1000 gf would make smooth handle operation difficult. A preferable range of the handle torque is between 400 and 800 gf.

The following initial test and endurance test were conducted to confirm the water stopping capacity and lever operability.

1) Initial test: The initial water stopping capacity and lever operability were determined before the endurance test.

2) Endurance test: The lever of each valve assembly was coupled to an endurance tester (made by NTN Engineering Plastics Corporation) and moved, as shown in FIG. 6, from the upper right position RU (water supply stopped), to the lower right position RD (cold water is supplied), then to lower left LD (boiling water, 90° C.), to upper left LU (water stopped), to lower left LD (boiling water, 90° C.), to lower center CD (hot water, 45° C.), to upper center CU (water stopped), to lower center CD (hot water, 45° C.), to lower right RD (cold water), and to upper right position RU (water supply stopped). This cycle (which took about 25 seconds) was repeated many times. At 100000-cycle and 200000-cycle points, their water stopping capacity and lever operability were measured. For the valve assemblies that showed poorer water stopping capacity than the initial results, no further endurance test was carried out.

3) Water absorption test

The water stopping capacity of each valve body and lever operability were measured after immersing the valve body in boiling water (90° C.) for 200 hours.

(2) Resistance to Scratches 1 g of metal (gun metal) pieces having an average particle diameter of 3 μm were fed into the valve assembly together with water which was supplied at a rate of 8 liters/minute. While the abovementioned lever operation cycle was repeated 10 times. After the test, the sliding contact surface of each valve body was measured using a surface roughness gauge (made by Sloan Technology Corporation: type Dektak II). In the Tables, the marks ○, Δ and X indicate that valve bodies were completely free of scratches, that they suffered scratches but their depths were shallower than 1 μm, and that they developed scratches deeper than 1 μm, respectively.

(3) Change in the Surface Shape Due to Water Absorption

The shape of the sliding contact surface of each valve body was measured with a surface roughness gauge before and after immersing it in boiling water (90° C.) for 200 hours. The marks ○, Δ and X in the Tables mean that the surface shape changed less than 3 μm, between 3 μm and 5 μm, and more than 5 μm, respectively.

As will be apparent from Tables 3 and 4, the Examples 1–8 achieved good results in the water stopping capacity and operability of the lever in the initial test of the function tests. The results of the endurance test was also good. Namely, after the 200000-cycle endurance test, the water pressure dropped only 0.3 kgf/cm$^2$ or less, and the lever operability was high, i.e. the lever torque was within a range of 300–1000 gf. Even after absorbing water, no noticeable change was observed in the water stopping capacity, lever operability and the shape of the valve body and valve seat.

In Examples 5–8, which contained PTFE powder, the movement of the lever was slightly lighter than in the Examples that contained no PTFE powder.

As for the resistance to scratches, Example 6, which contained 40 parts by weight of glassy carbon and 30 parts by weight of PTFE powder with respect to 100 parts by weight of PEN, suffered barely noticeable scratches, but they had practically no influence on the performance of the entire valve assembly.

In contrast, in Comparative Example 1, having a composition essentially consisting of 100 parts by weight of PEN and 30 parts by weight of glassy carbon, the reduction of water pressure, which represents the water stopping capacity of the valve, exceeded 0.3 kgf/cm$^2$. The lever operability or torque was also unduly high, i.e. higher than 1000 gf.

Comparative Examples 2 and 3, which contained 40 parts by weight of PTFE powder, were low in the water stopping capacity and resistance to scratches. Comparative Example 4, which contained PEN and mica, Comparative Example 6, which contained PPS, carbon fiber and mica, Comparative Example 7, which contained PEI and carbon fiber, and Comparative Example 8, which contained PES and carbon fiber, were so poor in lever operability that they were practically useless. Comparative Example 5, which contained PE and carbon fiber, was extremely low in its water stopping capacity.

(EXAMPLES 9–11 AND COMPARATIVE EXAMPLE 9)

Example 9 is described with reference to FIGS. 1–3.

Figure 2:
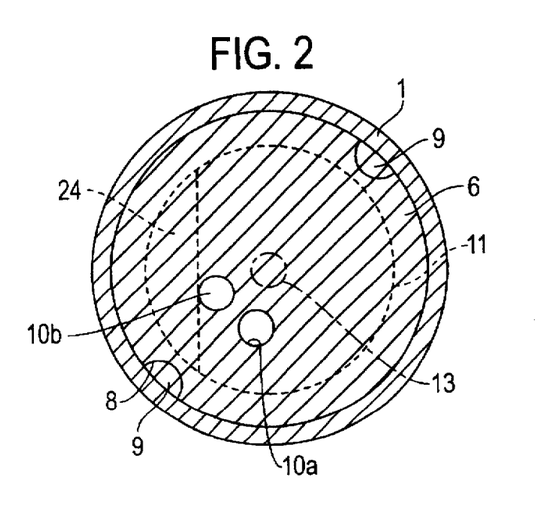
FIG. 2 is a sectional view taken along line II—II of FIG. 1.
Figure 3:
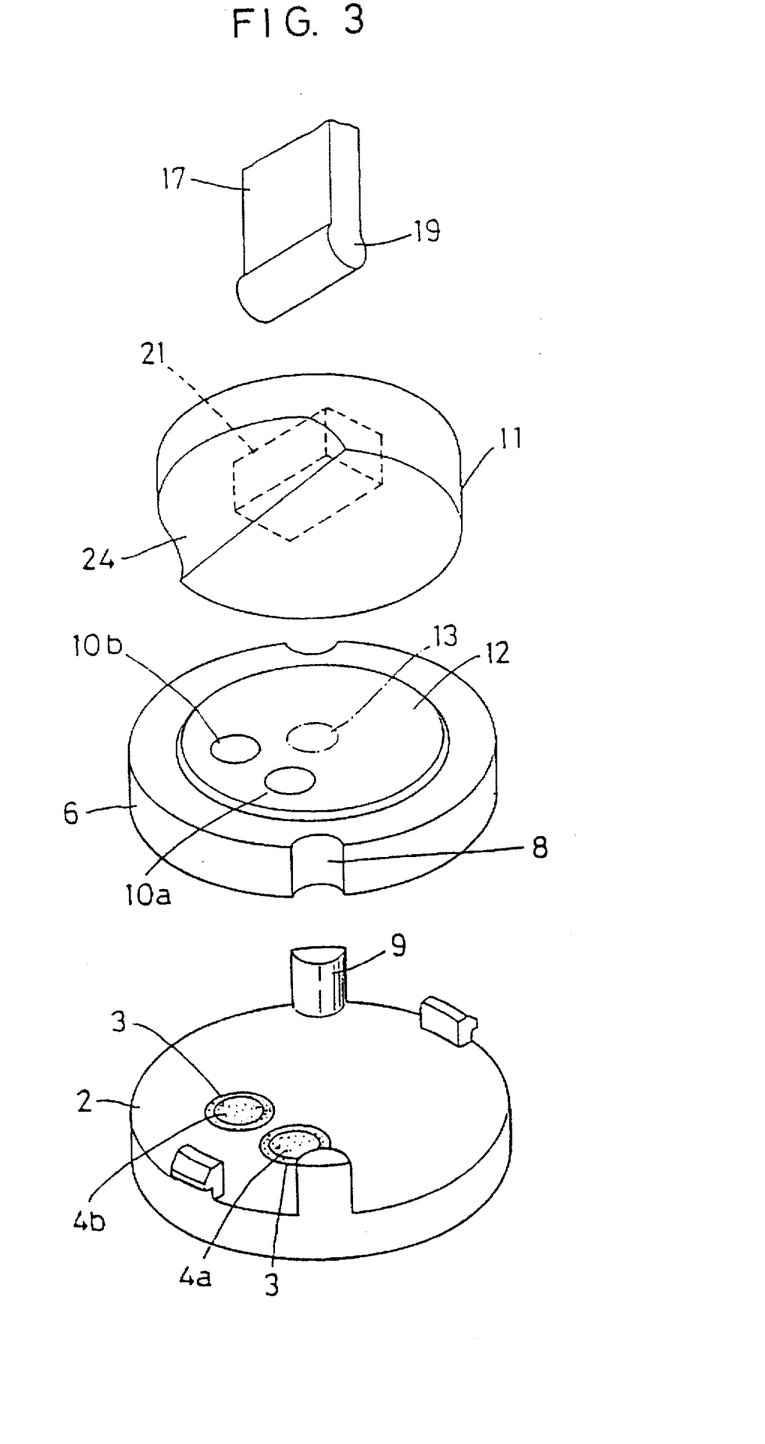
FIG. 3 is an exploded perspective view of Example 9.

The Example 9 shown in FIGS. 1–3 differs from the prior art shown in FIG. 9 in that its valve seat 6 has a circular land portion 12 formed on its top surface that is in sliding contact with the valve body. This land has a smaller diameter than the valve body 11.

Namely, the Example 9 comprises a tubular valve casing 1, a bottom plate 2 inserted in the bottom of the valve casing 1, and two seal members 3 mounted in the bottom plate 2, defining two water inlets 4a and 4b.

The circular valve seat 6 is supported on the bottom plate 2. It is formed with axial grooves 8 along its outer circumference. On the other hand, the bottom plate 2 has protrusions 9 along its outer circumference. The protrusions 9 engage in the grooves 8, preventing the rotation of the valve seat 6. The valve seat 6 has two valve holes 10a and 10b adapted to communicate with the inlets 4a and 4b.

The valve seat 6 is formed from a synthetic resin having a composition comprising 80% by weight of polyphenylene sulfide resin (PPS) and 20% by weight of carbon fiber.

The valve body 11 supports a lever holder 14 that is rotatably mounted in the valve casing 1. A seal member 15a is fitted on the outer periphery of the valve holder 14 at its lower portion. It prevents water leakage by contacting the inner surface of the valve casing 1. Further, a ring-shaped, high-density polyethylene (HMWPE) seal member 15b is fitted on the bottom surface of lever holder 14. It contacts the top surface of the valve body 11, providing a seal between the lever holder 14 and the valve body 11.

The lever holder 14 is formed with a shaft receiving hole 16 extending vertically to receive a lever shaft 17, which is rotatably supported on the lever holder 14 through a pin 18.

The lever shaft 17 has a bottom coupling portion 19 inserted in a hole 21 formed in the top surface of the valve body 11.

By pivoting the lever shaft 17 about a pin 18, the valve body 11 slides along the top surface of the valve seat 6. By turning the lever shaft 17 about its own axis, the lever holder 14 is rotated, so that the pin 18, which supports the lever shaft 17, is turned. Thus, the lever shaft 17 can be pivoted in any desired direction. The valve body 11 can be slid in the direction in which the lever shaft 17 is pivoted.

The valve body 11 is made of a ceramic material containing alumina. A water mixing chamber 22 is defined between the outer periphery of the valve body 11 and the inner periphery of the valve casing 1. Its outlet 23 is formed in the peripheral wall of the casing 1.

A water passage 24 is formed in the bottom of the valve body 11. By sliding the valve body 11, the passage 24 is selectively brought into or out of communication with one or both of the valve holes 10a and 10b in the valve seat.

The valve assembly of the Example 9 is used as follows. To supply water, the valve body 11 is slid along the top surface of the land portion 12 by turning and pivoting the lever shaft 17 until the passage 24 communicates with one or both of the valve holes 10a and 10b of the valve seat 6.

When the passage 24 is brought into communication with both the valve holes 10a and 10b, hot water supplied through one of the inlets 4a and 4b and cold water supplied through the other inlet flow through the respective valve holes 10a and 10b and the passage 24 into the water mixing chamber 22, are mixed together therein, and discharged through the outlet 23.

Either an ordinary faucet or a shower hose with a shower nozzle may be attached to the outlet 23.

To stop water, the valve body 11 is slid by controlling the lever shaft 17 until the passage 24 is disconnected from both valve holes 10a, 10b.

Figure 4:
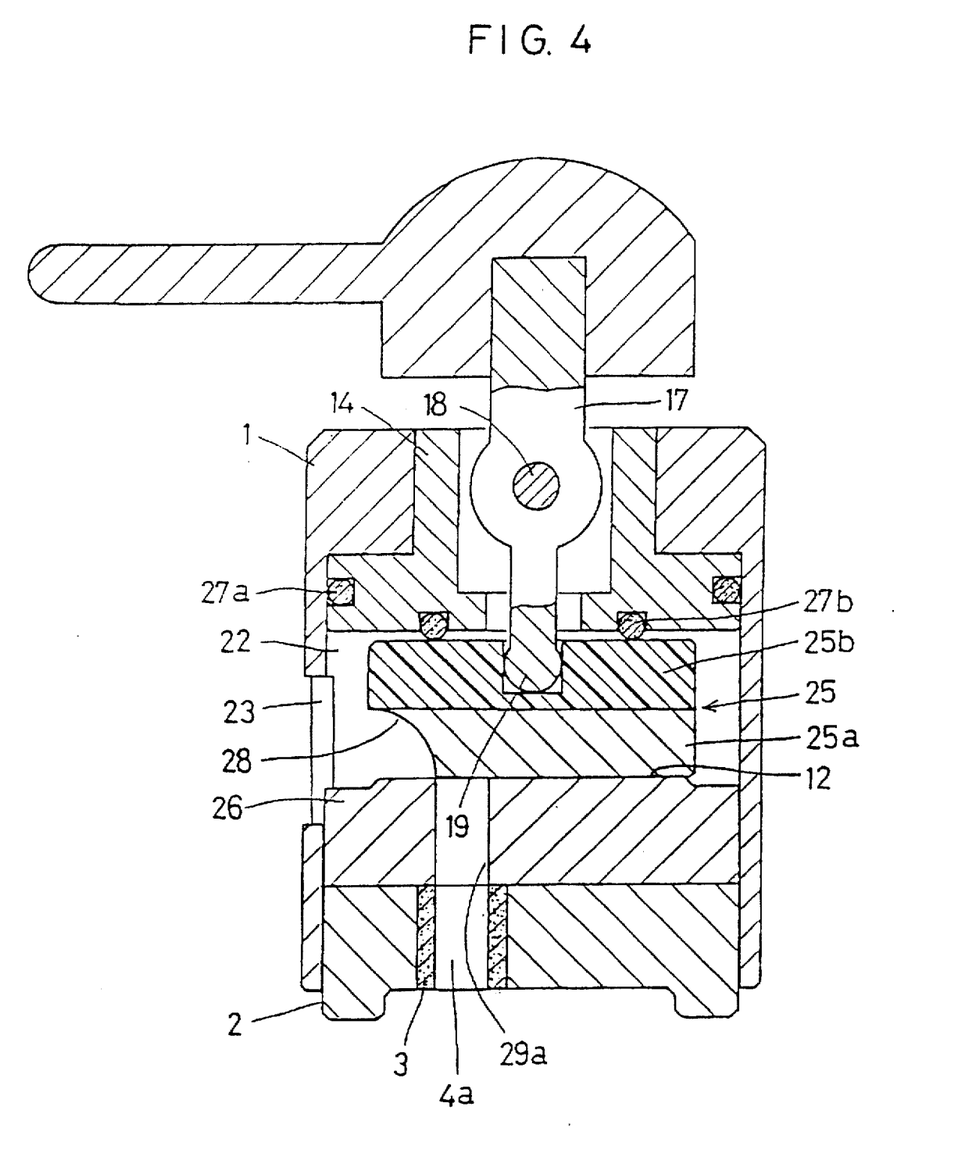
FIG. 4 is a vertical sectional front view of Example 10.
Figure 5:
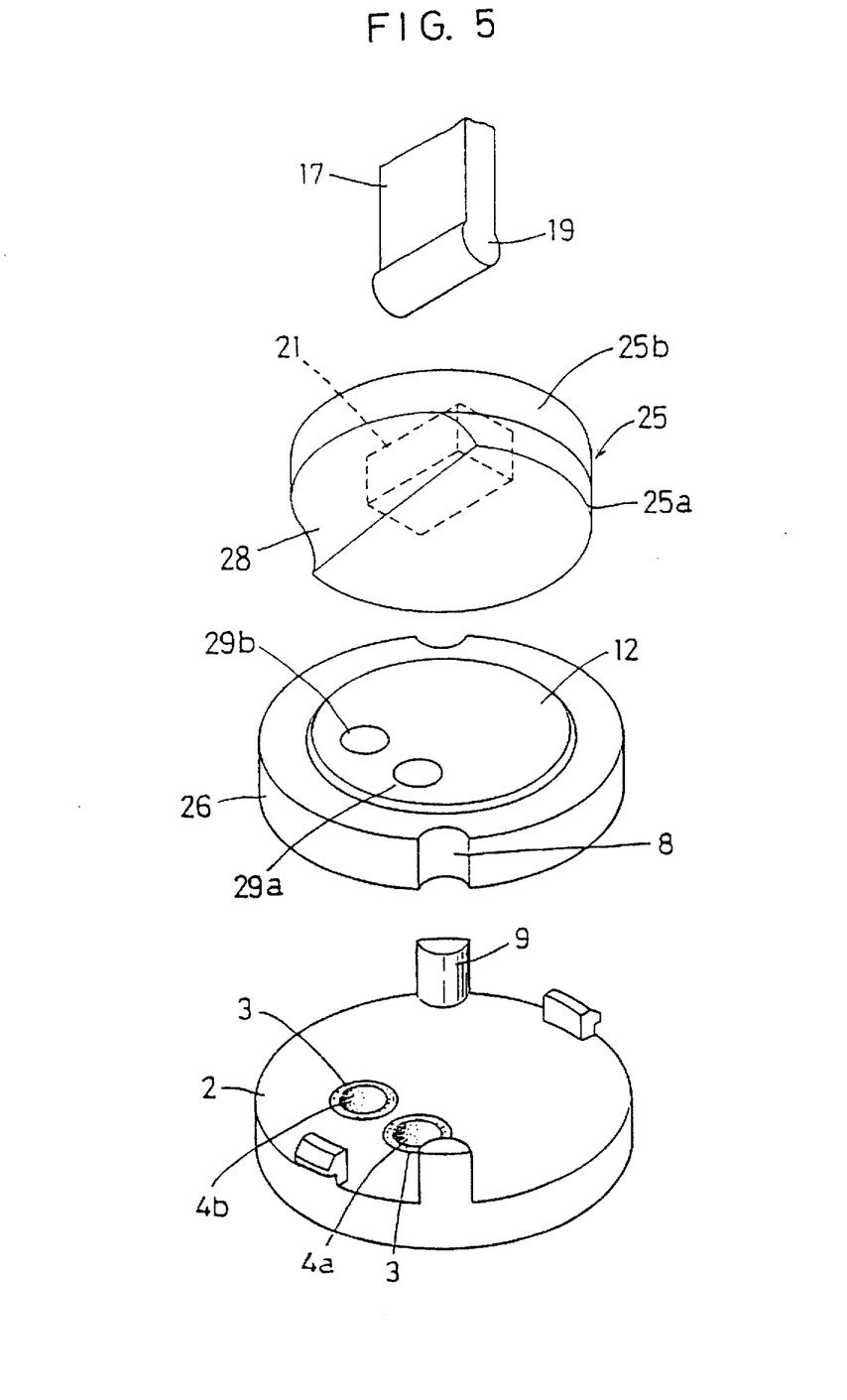
FIG. 5 is an exploded perspective view of Example 10.

Example 10 is described with reference to FIGS. 4 and 5.

In Example 10, the valve body 25 comprises an alumina ceramic layer 25a including the surface for sliding contact with the valve seat 26, and a synthetic resin layer 25b including the surface for sliding contact with a seal member 27b of a high-density polyethylene and having a composition comprising 80% by weight of a polyphenylene sulfide resin (PPS) and 20% by weight of carbon fiber. Otherwise, this example is structurally the same as Example 1.

The ceramic layer 25a and the synthetic resin layer 25b are joined together by press-fitting the convex ceramic layer 25a into the concave synthetic resin layer 25b or by insert-molding in which a synthetic resin is injection-molded in a mold containing a ceramic material. Otherwise, the layers 25a and 25b may be adhesively bonded together or heat-fused together using ultrasonics.

Example 11 is the same as Example 9 except that a through hole 13 is formed in the land portion 12 as shown by chain line in FIGS. 1–3.

Comparative Example 9 is the conventional valve assembly shown in FIG. 9. It differs from Example 9 in that the valve seat 44 has no land portion.

Examples 9–11 and Comparative Example 9 were tested for water stopping capacity and lever operability in the aforementioned manner. The test results are shown in Table 5.

As will be apparent from the results of Table 5, Examples 9–11 were superior in their water stopping capacity and lever operability to Comparative Example 9, which has no land portion on the valve seat. In any of the Examples 9–11, the water pressure dropped only 0.3 kgf/cm$^2$ when a water pressure of 17.5 kgf/cm² is applied. The handle torque (operability) was also within an acceptable range of 300–1000 gf. The lever operability was especially high in Example 10, in which the valve body comprised a ceramic layer and a synthetic resin layer. Its performance was stable too.

(EXAMPLE 12)

Figure 7:
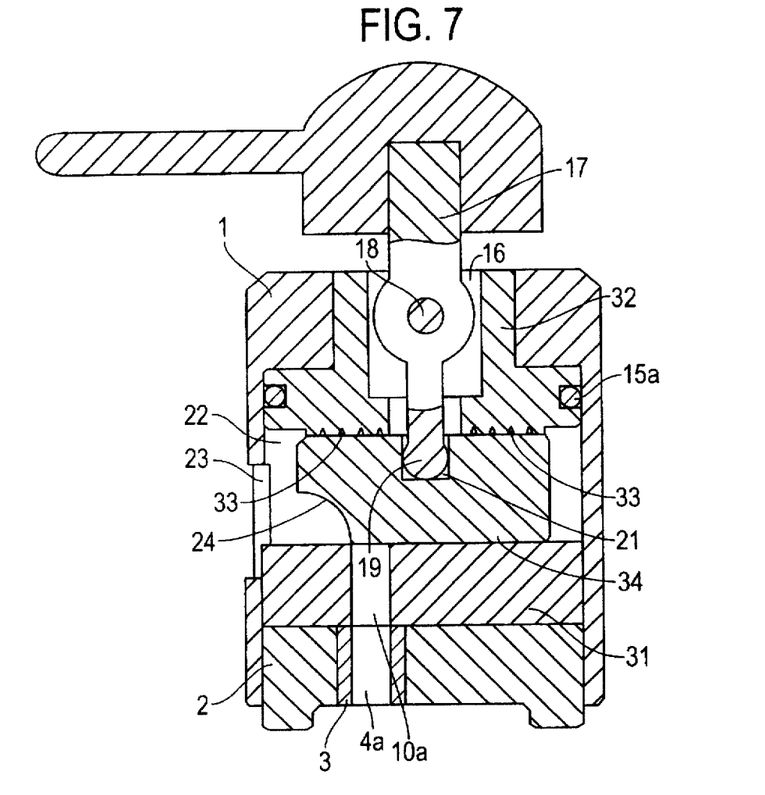
FIG. 7 is a vertical sectional front view of Example 12.
Figure 8:
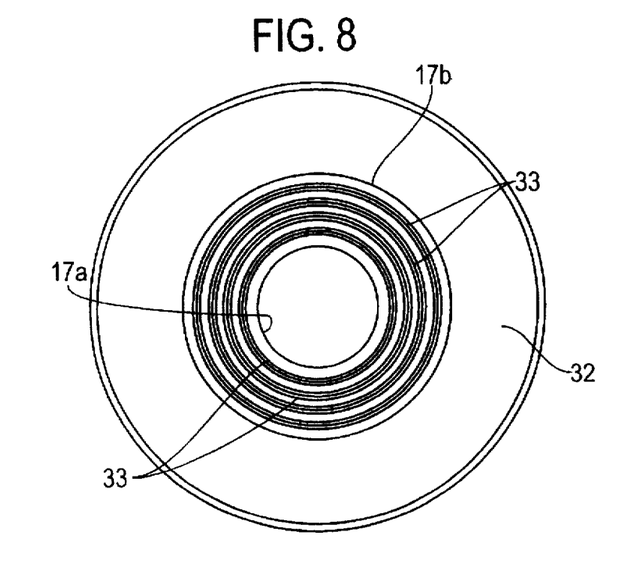
FIG. 8 is a bottom view of the valve seat of Example 12.

Example 12 and Comparative Example 10 are described with reference to FIGS. 7 and 8.

Example 12 differs from Example 9 shown in FIGS. 1 and 2 in that no land portion is formed on the top surface of the valve seat 31, and that a plurality of concentric circular grooves 33 are formed in the bottom surface of the lever holder 32 to be brought into sliding contact with the valve body 34. The same elements used in Example 9 are denoted by the same numerals and their description is omitted.

The ring-shaped slide contact surface at the bottom end of the lever holder 32 is dome-shaped with its inner edge 17a (FIG. 8) bulging 10–20 μm above the outer edge 17b. The top surface of the valve body 34 to be brought into sliding contact with the lever holder 32 is also dome-shaped with its central portion bulging 3–8 μm from the circumference. A silicone grease is retained in the circular grooves 33. The valve body 34 is formed from an alumina ceramic material, and the lever holder 32 from HMWPE.

The circular grooves 33 are V-shaped grooves 0.5 mm wide and 0.6 mm deep. They are arranged at equal intervals of 0.7 mm. Instead of the V-shaped section, they may have a U-shaped, square or any other sectional shape. The number and diameter of such circular grooves should be determined so that water leakage will be minimum. The abovementioned various dimensions of the grooves are mere examples and thus freely changeable.

(COMPARATIVE EXAMPLE 10)

Structurally, Comparative Example 10 is exactly the same as Comparative Example 9. Similar to Example 12, its valve body is formed from an alumina ceramic material and the lever holder from HMWPE.

Example 12 and Comparative Example 10 were tested for their water stopping capacity and lever operability. The test results are shown in Table 6.

As will be apparent from the results of Table 6, the Example 12, formed with a plurality of concentric circular grooves in the bottom surface of the lever holder to be brought into sliding contact with the valve body, was superior in its water stopping capacity and lever operability to the conventional valve assembly as the Comparative Example 10.

Industrial Application

By forming at least one of the valve seat and the valve body from a resin composition comprising a polycy-anoarylether resin and a predetermined amount of glassy carbon having a predetermined particle diameter, it is possible to improve its dimensional accuracy. Also, such a valve body or valve seat is highly wear-resistant, so that it can keep its low surface roughness while in use and is less likely to be damaged by foreign matter.

Since such a valve body or valve seat has excellent mechanical properties such as creep resistance and high self-lubricity, the valve assembly has improved water stopping capacity and can improve lever operability.

By providing a land portion having a smaller diameter than the valve body on the surface of the valve seat to be brought into sliding contact with the valve body, even if the valve seat is deformed under water supply pressure, the land portion will not be deformed with only the outer-diameter portion of the valve seat deformed. The land portion will be always kept in close contact with the valve body, preventing water leakage through a gap between the valve body and the valve seat.

By using a ceramic valve body and a synthetic resin valve seat with a land portion having a smaller diameter than the valve body and adapted to be brought into sliding contact with the valve body, the valve body encounters only an extremely small resistance while sliding. The valve seat is thus less likely to be worn, so that it is possible to prevent the valve body from sticking to the valve seat. This assures easy and smooth movement of the lever for a long time.

By forming a portion of the valve body including the surface to be brought into sliding contact with the valve seat from a ceramic material and its portion to be brought into contact with the seat member from a synthetic resin, it is possible to reduce slide resistance between the valve body and the seal member. This permits still easier and smoother operation of the lever, while preventing water leakage. By forming a hole in the surface of the land portion to be brought into sliding contact with the valve body, it is possible to reduce the slide resistance of the vale body still further, so that the valve body can be moved still more smoothly.

By forming a plurality of concentric grooves in the bottom surface of the lever holder to be brought into sliding contact with the valve body, it is possible to more positively prevent water leakage through a gap between the lever holder and the valve body while not impairing smooth operation of the lever.

In an arrangement in which the slide contact surface of the lever holder having the concentric grooves have a dome shape, this surface will become completely flat if an excessive pressure acts on this surface, so that water leakage can be prevented completely.

By retaining lubricating oil or lubricating grease in the concentric grooves, it is possible to reduce the slide resistance of the lever holder still further while preventing water leakage. Thus, the lever operability improves even more.

TABLE 1

| | Item | | | | |
|---|---|---|---|---|---|
| Material | Bend strength (kgf/mm²) | Hardness Hv (kgf/mm²) | Linear expansion coefficient (× 10⁻⁶/°C.) | Thermal conductivity (Cal/cm sec · °C.) | Thermal shock resistance (water cooled) (°C.) |
| Alumina (Al$_2$O$_3$) | 5–85 | 1200–2300 | 4.6–9.3 | 0.004–0.1 | 180–500 |
| Zirconia (ZrO$_2$) | 2–240 | 750–1600 | 5.4–11.5 | 0.004–0.07 | 200–470 |
| Silica (SiO$_2$) | 4–6 | — | 0.5 | 0.003 | ≧1000 |

TABLE 1-continued

| Material | Bend strength (kgf/mm²) | Hardness Hv (kgf/mm²) | Linear expansion coefficient (× 10⁻⁶/°C.) | Thermal conductivity (Cal/cm sec · °C.) | Thermal shock resistance (water cooled) (°C.) |
|---|---|---|---|---|---|
| Silicon carbide (SiC) | 6–100 | 1800–3700 | 3.1–5 | 0.07–0.6 | 200–700 |
| Silicon nitride (Si$_3$N$_4$) | 3–120 | 1100–1900 | 1.9–4 | 0.01–0.07 | 400–900 |
| Sialon Si$_{6-z}$Al$_z$N$_{8-z}$ (Z = 0–4.2) | 60–140 | 1400–2500 | 2.4–3.4 | 0.02–0.07 | 500–900 |
| Aluminium nitride (AlN) | 5–70 | 1000–1200 | 4.4–5.7 | 0.14–0.6 | 300–400 |
| Titanium nitride (TiN) | 160–200 | 1200–1600 | — | — | — |
| Tungsten carbide | 180–300 | — | — | — | — |

TABLE 2

| Characteristics | Alumina |
|---|---|
| Compressive strength (kgf/mm²) | 100–450 |
| Bending strength (kgf/mm²) | 30–50 |
| Hardness (Hv) (kgf/mm²) | 1500–2000 |
| Young's modulus (× 10⁴ kgf/mm²) | 2.5–4.8 |
| Fracture toughness (MN/m$^{3/2}$) | 3.0–4.6 |
| Poisson's rate | 0.19–0.26 |
| Linear expansion coefficient (× 10⁻⁵/°C.) | 7–9 |
| Thermal conductivity (cal/cm · sec · °C.) | 0.01–0.07 |
| Thermal shock resistance (°C.) | 200–250 |
| Specific heat (cal/g · °C.) | 0.17–0.33 |

TABLE 3

| Item | Example Nos. | | | | | | | |
|---|---|---|---|---|---|---|---|---|
| | 1 | 2 | 3 | 4 | 5 | 6 | 7 | 8 |
| Material content (wt part) | | | | | | | | |
| PEN (1) | 100 | 100 | 100 | 100 | 100 | 100 | 100 | 100 |
| GC (2) | 40 | 85 | 120 | 165 | 40 | 40 | 165 | 165 |
| PTFE (3) | — | — | — | — | 10 | 30 | 10 | 30 |
| Water stopping capability (kgf/cm²) | | | | | | | | |
| Initial value | 0.19 | 0.20 | 0.20 | 0.18 | 0.20 | 0.19 | 0.20 | 0.20 |
| After 100000 cycles | 0.22 | 0.23 | 0.22 | 0.21 | 0.23 | 0.24 | 0.22 | 0.22 |
| After 200000 cycles | 0.26 | 0.27 | 0.25 | 0.24 | 0.28 | 0.30 | 0.24 | 0.26 |
| After water absorbed | 0.20 | 0.21 | 0.29 | 0.19 | 0.21 | 0.20 | 0.20 | 0.20 |
| Lever torque (gf) | | | | | | | | |
| Initial value | 500 | 480 | 440 | 380 | 475 | 440 | 360 | 315 |
| After 100000 cycles | 630 | 595 | 560 | 480 | 620 | 625 | 530 | 480 |
| After 200000 cycles | 790 | 760 | 720 | 655 | 820 | 850 | 760 | 800 |
| After water absorbed | 510 | 490 | 450 | 385 | 490 | 480 | 370 | 320 |
| Scratch resistance | O | O | O | O | O | Δ | O | O |
| Change in shape due to water absorption | O | O | O | O | O | O | O | O |

TABLE 4

| Item | Comparative Example Nos. | | | | | | | |
|---|---|---|---|---|---|---|---|---|
| | 1 | 2 | 3 | 4 | 5 | 6 | 7 | 8 |
| Material content (wt part) | | | | | | | | |
| PEN (1) | 100 | 100 | 100 | 100 | — | — | — | — |
| GC (2) | 30 | 40 | 165 | — | — | — | — | — |
| PTFE (3) | — | 40 | 40 | — | — | — | — | — |
| PE (4) | — | — | — | — | 100 | — | — | — |
| PPS (5) | — | — | — | — | — | 100 | — | — |
| PEI (6) | — | — | — | — | — | — | 100 | — |
| PES (7) | — | — | — | — | — | — | — | 100 |
| CF (8) | — | — | — | — | 40 | 50 | 40 | 40 |
| Mica (9) | — | — | — | 40 | — | 15 | — | — |
| Water stopping capability (kgf/cm²) | | | | | | | | |
| Initial value | 0.21 | 0.21 | 0.21 | 0.24 | 1.00 | 0.26 | 0.23 | 0.24 |
| After 100000 cycles | 0.27 | 0.31 | 0.30 | 0.41 | — | 0.32 | 0.25 | 0.27 |
| After 200000 cycles | 0.36 | 0.44 | 0.41 | — | — | 0.60 | — | 0.29 |
| After water absorbed | 0.22 | 0.22 | 0.21 | 0.25 | — | 0.29 | 0.23 | 0.25 |
| Lever torque (gf) | | | | | | | | |
| Initial value | 550 | 410 | 265 | 1020 | 520 | 540 | 940 | 780 |
| After 100000 cycles | 760 | 630 | 500 | 1315 | — | 820 | 1430 | 920 |
| After 200000 cycles | 1120 | 925 | 895 | — | — | 1220 | — | 1255 |
| After water absorbed | 570 | 420 | 670 | 1030 | — | 575 | 980 | 795 |
| Scratch resistance | X | X | X | Δ | X | X | O | O |
| Change in shape due to water absorption | O | O | O | Δ | O | X | O | O |

TABLE 5

| Item | Nos. | | | |
|---|---|---|---|---|
| | Examples | | | Comparative |
| | 9 | 10 | 11 | example 9 |
| Water stopping capability* | | | | |
| Initial | 0.24 | 0.23 | 0.25 | 0.51 |
| After endurance test | 0.28 | 0.28 | 0.28 | 0.61 |

TABLE 5-continued

| | Nos. | | | |
|---|---|---|---|---|
| | Examples | | | Comparative |
| Item | 9 | 10 | 11 | example 9 |
| Lever torque** | | | | |
| Initial | 650 | 615 | 630 | 645 |
| After endurance test | 855 | 770 | 850 | 910 |
| Overall judgement | ○ | ⊙ | ○ | X |

*kgf/cm$^2$
**gf

TABLE 6

| | Nos. | |
|---|---|---|
| | Examples | Comparative |
| Item | 12 | example 10 |
| Water stopping capability* | | |
| Initial | 0.23 | 0.23 |
| After endurance test | 0.28 | 0.68 |
| Lever torque** | | |
| Initial | 530 | 520 |
| After endurance test | 920 | 1100 |
| Overall judgement | ○ | X |

*kgf/cm$^2$
**gf

We claim:

1. A valve assembly comprising a valve seat having valve holes, a valve body slidably mounted on said valve seat, and a lever for sliding said valve body on said valve seat to selectively open and close said valve holes, at least one of said valve body and valve seat being a molding of a resin composition comprising 100 parts by weight of a polycyanoarylether resin, and 40–165 parts by weight of glassy carbon having an average particle diameter not exceeding 25 μm.

2. A valve assembly comprising a valve seat having valve holes, a valve body slidably mounted on said valve seat, and a lever for sliding said valve body on said valve seat to selectively open and close said valve holes, at least one of said valve body and valve seat being a molding of a resin composition comprising 100 parts by weight of a polycyanoarylether resin, 40–165 parts by weight of glassy carbon having an average particle diameter not exceeding 25 μm, and not more than 30 parts by weight of a fluororesin powder.

3. A valve assembly as claimed in claim 2 wherein said fluororesin powder is tetrafluoroethylene resin powder.

4. A valve assembly as claimed in claim 3 wherein said tetrafluoroethylene resin powder is recycled tetrafluoroethylene resin powder.

5. A valve assembly as claimed in claim 4 wherein said valve seat comprise a land portion to be brought into sliding contact with said valve body and a hole is formed in a surface of said land portion to be brought into sliding contact with said valve body.

6. A valve assembly comprising a valve seat having valve holes, a valve body slidably mounted on said valve seat, a lever for sliding said valve body on said valve seat to selectively open and close said valve holes, and a lever holder supporting said lever and keeping said valve body and valve seat in close contact with each other, said lever holder being formed with a plurality of concentric grooves in a surface thereof that is to be brought into sliding contact with said valve body.

7. A valve assembly as claimed in claim 6 wherein the surface of said lever holder to be brought into sliding contact with said valve body is dome-shaped, having an inner edge bulging relative to an outer edge thereof.

8. A valve assembly as claimed in claim 6 or 7 wherein a lubricating oil or a lubricating grease is retained in said concentric grooves.

9. A valve assembly as claimed in claim 7 wherein a lubricating oil or a lubricating grease is retained in said concentric grooves.

* * * * *